(12) United States Patent
Huang et al.

(10) Patent No.: US 9,800,374 B2
(45) Date of Patent: Oct. 24, 2017

(54) METHODS AND DEVICES FOR REPORTING AND ISSUING FREQUENCY BAND EXTENSION CAPABILITY

(71) Applicant: ZTE Corporation, Shenzhen, Guangdong (CN)

(72) Inventors: He Huang, Shenzhen (CN); Zhifeng Ma, Shenzhen (CN); Yiqing Cao, Shenzhen (CN); Zijiang Ma, Shenzhen (CN); Hongjun Liu, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 231 days.

(21) Appl. No.: 14/428,082

(22) PCT Filed: Aug. 30, 2013

(86) PCT No.: PCT/CN2013/082733
§ 371 (c)(1),
(2) Date: Mar. 13, 2015

(87) PCT Pub. No.: WO2014/040503
PCT Pub. Date: Mar. 20, 2014

(65) Prior Publication Data
US 2015/0312005 A1    Oct. 29, 2015

(30) Foreign Application Priority Data
Sep. 17, 2012    (CN) .......................... 2012 1 0344342

(51) Int. Cl.
*H04J 3/00* (2006.01)
*H04L 1/16* (2006.01)
(Continued)

(52) U.S. Cl.
CPC .............. *H04L 1/1628* (2013.01); *H04L 5/14* (2013.01); *H04W 8/22* (2013.01);
(Continued)

(58) Field of Classification Search
None
See application file for complete search history.

(56) References Cited

U.S. PATENT DOCUMENTS

2003/0148764 A1    8/2003    Kelley
2004/0106430 A1    6/2004    Schwarz
(Continued)

FOREIGN PATENT DOCUMENTS

CN    101568059 A    10/2009
CN    101959251 A    1/2011
(Continued)

OTHER PUBLICATIONS

Supplementary European Search Report in European application No. 13837895.5, mailed on Apr. 12, 2016.
(Continued)

*Primary Examiner* — Phirin Sam
(74) *Attorney, Agent, or Firm* — Oppedahl Patent Law Firm LLC (57) ABSTRACT

Methods and devices for reporting and issuing a band extension capability are provided. A terminal side receives terminal capability query information from a network side, determines band interval lists to which each band supported by the terminal side belongs, and reports the supported bands through cells corresponding to the band interval lists to which each band belongs; and the network side determines band interval lists to which each band supported by the network side belongs when issuing a band capability supported by the network side, and issues the supported bands through cells corresponding to the band interval lists to which each band belongs. By the solutions of the disclosure, the bands belonging to different band interval lists can be reported and issued through different cells, and the
(Continued)

---

101: A terminal side receives terminal capability query information from a network side 102: The terminal side determines band interval lists to which each band supported by the terminal side belongs 103: The terminal side reports the supported bands through cells corresponding to the band interval lists to which each band band belongs problem of limitations to the number of the bands during the reporting and issuing of the bands is solved.

20 Claims, 1 Drawing Sheet

(51) Int. Cl.
*H04W 72/04* (2009.01)
*H04L 5/14* (2006.01)
*H04W 8/22* (2009.01)
*H04W 8/24* (2009.01)

(52) U.S. Cl.
CPC ..... *H04W 72/0406* (2013.01); *H04W 72/048* (2013.01); *H04W 72/0453* (2013.01); *H04W 8/24* (2013.01)

(56) References Cited

U.S. PATENT DOCUMENTS

| | | | |
|---|---|---|---|
| 2007/0264994 A1 | 11/2007 | Schwarz | |
| 2009/0213806 A1 | 8/2009 | Ode | |
| 2012/0120896 A1 | 5/2012 | Ode | |
| 2012/0120897 A1 | 5/2012 | Ode | |
| 2012/0122409 A1 | 5/2012 | Ode | |
| 2012/0257551 A1 | 10/2012 | Diao | |
| 2013/0039232 A1* | 2/2013 | Kim | H04L 5/14 370/280 |
| 2013/0070709 A1* | 3/2013 | Wang | H04L 25/00 370/329 |
| 2014/0092825 A1* | 4/2014 | Bostrom | H04W 72/048 370/329 |
| 2014/0126558 A1* | 5/2014 | Kim | H04W 74/04 370/336 |
| 2014/0286219 A1* | 9/2014 | Siomina | H04J 11/0023 370/311 |

FOREIGN PATENT DOCUMENTS

| | | |
|---|---|---|
| CN | 102045763 A | 5/2011 |
| CN | 102123466 A | 7/2011 |
| EP | 2081395 A1 | 7/2009 |
| WO | 2004004407 A1 | 1/2004 |
| WO | 2010076376 A1 | 7/2010 |
| WO | 2011079587 A1 | 7/2011 |
| WO | 2012017087 A1 | 2/2012 |

OTHER PUBLICATIONS

International Search Report in international application No. PCT/CN2013/082733, mailed on Dec. 19, 2013.
English Translation of the Written Opinion of the International Search Authority in international application No. PCT/CN2013/082733, mailed on Dec. 19, 2013.

* cited by examiner

METHODS AND DEVICES FOR REPORTING AND ISSUING FREQUENCY BAND EXTENSION CAPABILITY

TECHNICAL FIELD

The disclosure relates to a mobile communication technology, in particular to methods and devices for reporting and issuing a frequency band extension capability.

BACKGROUND

In order to provide users with various service contents such as audio, packet data and broadcast, wireless communication networks are widely deployed; and in order to meet an increasing requirement of users on communication quality and communication rate, a wireless communication technology (wireless network) is continuously evolved and developed. The wireless communication network has been evolved from a 2nd/2.5th-generation Global System for Mobile Communication/General Packet Radio Service (GSM/GPRS) mobile communication network to a 3rd-generation Universal Mobile Telecommunications System (UMTS) mobile communication network. However, in order to improve frequency spectrum utilization efficiency better and meet a rapidly increasing requirement of users on wireless communication, the 3rd Generation Partnership Project (3GPP) puts forward a 4th-generation mobile communication technology-Long Term Evolution (LTE) and the further evolution technology-Long Term Evolution Advanced (LTE-A) on the basis of a UMTS.

In the LTE era, it is difficult to find a unified frequency band throughout the world; while based on a suggestion of the International Telecommunication Union (ITU), all conventional International Mobile Telecommunication (IMT) frequency spectrums can be applied to LTE. Therefore, LTE bands in each country are decentralized, mainly including 2.6 GHz, 2.3 GHz, 2.1 GHz, 1.8 GHz, 1.5 GHz, Advanced Wireless Service (AWS), 800 MHz, 700 MHz and the like. According to statistics on 50 operators that have announced frequencies, 41% of networks operate at 2.6 GHz, 21% of networks operate at 2.1 GHz, 12% of networks operate at 800 MHz, 10% of networks operate at 1.8 GHz, 8% of networks operate at 700 MHz, 4% of networks operate at 2.3 GHz, and 4% of networks operate at 1.5 GHz-1.7 GHz, from which we can learn that the decentralization condition is evident. A 64-byte positive integer cell is adopted to indicate a band supported by a terminal side or a network side in a conventional standard, and may indicate 64 bands within which 43 bands have been used at present. Table 1 shows a list of band intervals in use, and as shown in Table 1, there are 43 operating bands for Evolved UMTS Terrestrial Radio Access (EUTRA) of LTE at present, wherein the first 32 bands are used by Frequency Division Duplex (FDD), and the 33rd~43rd bands are used by Time Division Duplex (TDD).

TABLE 1

| EUTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |

TABLE 1-continued

| EUTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |

Note
[1]Band 6 is not applicable

According to the current band utilization, it is estimated that the increasing requirements of wireless data may cause 275 MHz frequency spectrum deficit if there are no new frequency spectrums by the year 2014. Therefore, new bands are developed in various countries in the world, and the number of bands available for LTE will soon break the limit of 64, and will exceed an upper band number limit supported by marks reported by the conventional bands.

SUMMARY

The embodiments of the disclosure mainly provide methods and devices for reporting and issuing a band extension capability, so as to solve the problem of limitations to the number of bands during the reporting and issuing of the bands.

The technical solution of the embodiments of the disclosure are implemented as follows.

An embodiment of the disclosure provides a method for reporting a band extension capability, the method including that:

a terminal side receives terminal capability query information from a network side, determines band interval lists to which each band supported by the terminal side belongs, and reports supported bands through cells corresponding to the band interval lists to which each band belongs.

In the solution, the band interval lists include band information and corresponding sequence numbers; each band interval list includes at least one piece of band information, and each piece of band information corresponds to a sequence number; and different band interval lists are different independent tables, or different intervals in a table.

In the solution, each of the band interval lists includes both TDD bands and FDD bands; and band information used by the TDD bands and band information used by the FDD bands are predefined in the band interval lists.

In the solution, each of the band interval lists includes TDD bands or FDD bands.

In the solution, the step that the terminal side reports the supported bands through the cells corresponding to the band interval lists to which each band belongs includes that: the terminal side fills in the cells corresponding to the band interval lists to which each band belongs with a sequence number of each band in the band interval lists to which each band belongs, includes the cells in a band reporting message, and reports the cells to the network side.

In the solution, the cells corresponding to the band interval lists to which each band belongs are as follows: different band interval lists correspond to different cells in the band reporting message, and the cells include cells for representing sequence numbers of bands in band interval lists to which the bands belong.

In the solution, the cells for representing the sequence numbers of the bands in the band interval lists to which the bands belong include first sub-cells and second sub-cells, wherein the first sub-cells represent the band interval lists to which the bands belong, and the second sub-cells represent the sequence numbers of the bands in the band interval lists to which the bands belong.

In the solution, the method further includes that: when the band interval lists to which each band belongs are different band interval lists, the cells corresponding to each band interval list are included in the band reporting message and presented in a list form, or are sequentially included in the band reporting message and presented in an individual cell form.

In the solution, the band reporting message is a Radio Resource Control (RRC) layer message, and includes: an RRC Connection Request, or User Equipment (UE) Capability Information or an RRC Connection Reestablishment Request.

An embodiment of the disclosure provides a device for reporting a band extension capability, the device including: a receiving module, a first determination module and a reporting module, wherein the receiving module is configured to receive terminal capability query information from a network side, and notify the first determination module;

the first determination module is configured to determine band interval lists to which each band supported by a terminal side belongs; and the reporting module is configured to report the supported bands through cells corresponding to the band interval lists to which each band belongs.

In the solution, each of the band interval lists includes band information and corresponding sequence numbers; each band interval list includes at least one piece of band information, and each piece of band information corresponds to the sequence numbers; and different band interval lists are different independent tables, or different intervals in a table.

In the solution, each of the band interval lists includes both TDD bands and FDD bands; and band information used by the TDD bands and band information used by the FDD bands are predefined in the band interval lists.

In the solution, each of the band interval lists includes TDD bands or FDD bands.

In the solution, the reporting module is configured to fill in the cells corresponding to the band interval lists to which each band belongs with a sequence number of each band in the band interval lists to which each band belongs, include the cells in a band reporting message, and report the cells to the network side.

In the solution, the cells corresponding to the band interval lists to which each band belongs are as follows: different band interval lists correspond to different cells in the band reporting message, and the cells include cells for representing sequence numbers of bands in band interval lists to which the bands belong.

In the solution, the cells for representing the sequence numbers of the bands in the band interval lists to which the bands belong include first sub-cells and second sub-cells, wherein the first sub-cells represent the band interval lists to which the bands belong, and the second sub-cells represent the sequence numbers of the bands in the band interval lists to which the bands belong.

An embodiment of the disclosure provides a method for issuing a band extension capability, the method including that:

a network side determines band interval lists to which each band supported by the network side belongs when issuing a band capability supported by the network side, and issues supported bands through cells corresponding to the band interval lists to which each band belongs.

In the solution, each of the band interval lists includes band information and corresponding sequence numbers; each of the band interval lists includes at least one piece of band information, and each piece of band information corresponds to a sequence number; and different band interval lists are different independent tables, or different intervals in a table.

In the solution, each of the band interval lists includes both TDD bands and FDD bands; and band information used by the TDD bands and band information used by the FDD bands are predefined in the band interval lists.

In the solution, each of the band interval lists includes TDD bands or FDD bands.

In the solution, the step that the network side issues the supported bands through the cells corresponding to the band interval lists to which each band belongs includes that: the network side fills in the cells corresponding to the band interval lists to which each band belongs with a sequence number of each band in the band interval lists to which each band belongs, includes the cells in a band issuing message, and issues the cells to a terminal side.

In the solution, the cells corresponding to the band interval lists to which each band belongs are as follows: different band interval lists correspond to different cells in the band issuing message, and the cells include cells for representing sequence numbers of bands in band interval lists to which the bands belong.

In the solution, the cells for representing the sequence numbers of the bands in the band interval lists to which the bands belong include first sub-cells and second sub-cells, wherein the first sub-cells represent the band interval lists to which the bands belong, and the second sub-cells represent the sequence numbers of the bands in the band interval lists to which the bands belong.

In the solution, the method further includes that: when the band interval lists to which each band belongs are different band interval lists, the cells corresponding to each band interval list are included in the band issuing message and presented in a list form, or are sequentially included in the band issuing message and presented in an individual cell form.

In the solution, the band issuing message is an RRC layer message, and includes: System Information, System Information Block Type 1, or RRC Connection Reconfiguration, or an RRC Connection Setup message or RRC Connection Reestablishment.

An embodiment of the disclosure provides a device for issuing a band extension capability, the device including: a second determination module and an issuing module, wherein the second determination module is configured to determine band interval lists to which each band supported by a network side belongs when issuing a band capability supported by the network side; and the issuing module is configured to issue the supported bands through cells corresponding to the band interval lists to which each band belongs.

In the solution, each of the band interval lists includes band information and corresponding sequence numbers; each of the band interval list includes at least one piece of band information, and each piece of band information corresponds to a sequence number; and different band interval lists are different independent tables, or different intervals in a table.

In the solution, each of the band interval lists includes both TDD bands and FDD bands; and band information used by the TDD bands and band information used by the FDD bands are predefined in the band interval lists.

In the solution, each band interval list only includes TDD bands or FDD bands.

In the solution, the issuing module is configured to fill in the cells corresponding to the band interval lists to which each band belongs with a sequence number of each band in the band interval lists to which each band belongs, include the cells in a band issuing message, and issue the cells to a terminal side.

In the solution, the cells corresponding to the band interval lists to which each band belongs are as follows: different band interval lists correspond to different cells in the band issuing message, and the cells include cells for representing sequence numbers of bands in band interval lists to which the bands belong.

In the solution, the cells for representing the sequence numbers of the bands in the band interval lists to which the bands belong include first sub-cells and second sub-cells, wherein the first sub-cells represent the band interval lists to which the bands belong, and the second sub-cells represent the sequence numbers of the bands in the band interval lists to which the bands belong.

In the embodiments of the disclosure provide the methods and devices for reporting and issuing a band extension capability, a terminal side receives terminal capability query information from a network side, determines band interval lists to which each band supported by the terminal side belongs, and reports supported bands through cells corresponding to the band interval lists to which each band belongs; the network side determines the band interval lists to which each band supported by the network side belongs when issuing a band capability supported by the network side, and issues the supported bands through the cells corresponding to the band interval lists to which each band belongs; therefore, the bands belonging to different band interval lists can be reported and issued through different cells, and the problem of limitations to the number of the bands during the reporting and issuing of the bands is solved.

DETAILED DESCRIPTION

In the embodiments of the disclosure, a terminal side receives terminal capability query information from a network side, determines band interval lists to which each band supported by the terminal side belongs, and reports the supported bands through cells corresponding to the band interval lists to which each band belongs; and the network side determines band interval lists to which each band supported by the network side belongs when issuing a band capability supported by the network side, and issues the supported bands through cells corresponding to the band interval lists to which each band belongs.

The terminal side may be a device such as a mobile phone, or a tablet Personal Computer (PC) or a PC; and the network side may be a device such as a core network element or a base station.

The disclosure is further described below with reference to the drawings and specific embodiments in detail.

Figure 1:
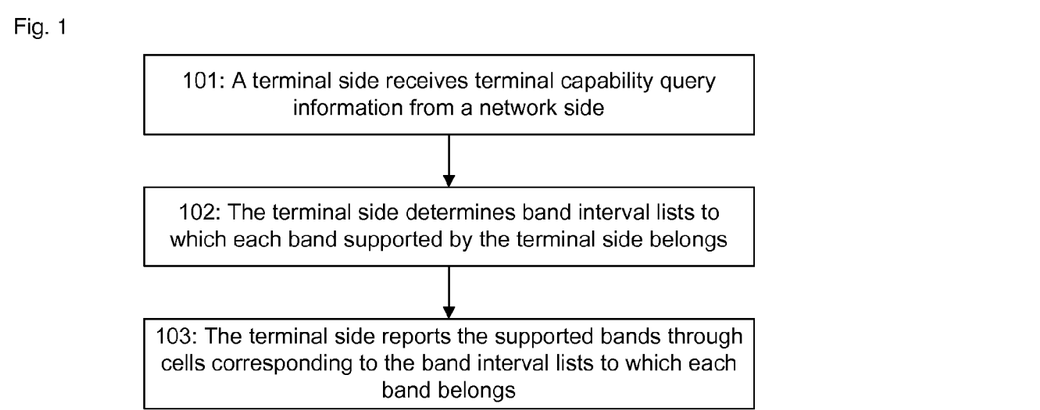
FIG. 1 is a flowchart of a method for reporting a band extension capability according to an embodiment of the disclosure.

An embodiment of the disclosure implements a method for reporting a band extension capability, and as shown in FIG. 1, the method includes the following steps that:

Step 101: a terminal side receives terminal capability query information from a network side;

Step 102: the terminal side determines band interval lists to which each band supported by the terminal side belongs, wherein each band interval list includes band information and corresponding sequence numbers; each band interval list may include at least one piece of band information, and each piece of band information corresponds to each sequence numbers one to one; different band interval lists are different independent tables, or are different intervals in one table, wherein different intervals refer to different sequence number segments, for example, if 256 bands are shown in a table, it is considered that the first 128 bands form a band interval list, and the next 128 bands form another band interval list; when the bands are reported, the first 128 bands correspond to a cell, and the next 128 bands correspond to another cell;

each band interval list may include both TDD bands and FDD bands; when each band interval list includes both TDD bands and FDD bands, band information used by the TDD bands and band information used by the FDD bands can be predefined in the band interval lists; for example, each band interval list may indicate totally 64 bands, it may be predefined that the FDD bands use the first 32 pieces of band information, and the TDD bands use the next 32 pieces of band information;

each band interval list may also include TDD bands or FDD bands only;

the band interval lists include used band interval lists and extended band interval lists; and the extended band interval lists may be extended band interval lists including both TDD bands and FDD bands, as shown in Table 2; or the band interval lists may also be LTE FDD extended band interval lists shown in Table 3 as well as LTE TDD extended band interval lists shown in Table 4, or may also be extended on the basis of the 64 bands of the used band interval lists as shown in Table 5, wherein Table 1 is adopted for the sequence numbers 1-64, Table 2 is adopted for the sequence numbers 65-128, the bands with the sequence numbers 65-96 in the bands with the sequence numbers 65-128 are allocated to FDD, the bands with the sequence numbers 97-128 are allocated to TDD, and the like.

TABLE 2

| EUTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 3920 MHz-3980 MHz | 3110 MHz-3170 MHz | FDD |
| ... | Reserved | Reserved | |
| 32 | Reserved | Reserved | FDD |
| 33 | 3900 MHz-3920 MHz | 3900 MHz-3920 MHz | TDD |
| ... | Reserved | Reserved | TDD |
| 64 | Reserved | Reserved | TDD |

Note
1: Band 6 is not applicable

TABLE 3

| EUTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 3920 MHz-3980 MHz | 3110 MHz-3170 MHz | FDD |
| ... | Reserved | Reserved | FDD |
| 64 | Reserved | Reserved | FDD |

Note
1: Band 6 is not applicable

TABLE 4

| EUTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 3900 MHz-3920 MHz | 3900 MHz-3920 MHz | TDD |
| ... | Reserved | Reserved | TDD |
| 64 | Reserved | Reserved | TDD |

Note
1: Band 6 is not applicable

TABLE 5

| EUTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| ... | | | |
| 64 | 3600 MHz-3800 MHz | 3600 MHz-3800 MHz | TDD |
| 65 | 3920 MHz-3980 MHz | 3110 MHz-3170 MHz | FDD |
| ... | Reserved | Reserved | FDD |
| 96 | Reserved | Reserved | FDD |
| 97 | 3900 MHz-3920 MHz | 3900 MHz-3920 MHz | TDD |
| ... | Reserved | Reserved | TDD |
| 128 | Reserved | Reserved | TDD |

Note
[1]Band 6 is not applicable

Step 103: the terminal side reports the supported bands through cells corresponding to the band interval lists to which each of bands belongs;

specifically, the terminal side fills in cells corresponding to band interval lists to which bands belong with sequence numbers of the bands in the band interval lists to which the bands belong, carries the cells via a band reporting message, and reports the cells to the network side;

the cells corresponding to the band interval lists to which each band belongs are as follows: different band interval lists correspond to different cells in the band reporting message, and each of the cells includes a cell for representing a sequence number of a band in a band interval list to which the band belongs, for example:

a cell corresponding to Table 1 is a band list supported in EUTRA (supportedBandListEUTRA), a cell corresponding to Table 2 is an extended band list supported in EUTRA (supportedBandListEUTRAExt). When a terminal supports a band with a sequence number 1 in Table 1 and bands with sequence numbers 1 and 33 in Table 2, the cell supportedBandListEUTRA includes only one cell SupportedBandEUTRA because the terminal only supports one band in Table 1, wherein the cell SupportedBandEUTRA includes a band identification sub-cell bandEUTRA, and bandEUTRA is given a value of 1 to indicate that the band (uplink: 1,920 MHz-1,980 MHz, downlink: 2,110 MHz-2,170 MHz) with the sequence number 1 in Table 1 is supported; and the cell supportedBandListEUTRAExt includes two cells SupportedBandEUTRA because the terminal supports the bands with the sequence numbers 1 and 33 in Table 2, wherein sub-cells bandEUTRA in the two cells SupportedBandEUTRA are give values of 1 and 33 respectively, and correspond to the band (uplink: 3,920 MHz-3,980 MHz, downlink: 3,110 MHz-3,170 MHz) with the sequence number 1 and the band (uplink: 3,900 MHz-3,920 MHz, downlink: 3,900 MHz-3,920 MHz) with the sequence number 33 in Table 2 respectively.

Here supportedBandListEUTRA and supportedBandListEUTRAExt are respectively defined as follows:

supportedBandListEUTRA is defined as follows, corresponding to the content in Table 1:

```
SupportedBandListEUTRA::= SEQUENCE (SIZE (1..maxBands))
OF SupportedBandEUTRA
    SupportedBandEUTRA::= SEQUENCE {
    bandEUTRA INTEGER (1..64)
    }
``` supportedBandListEUTRAExt is defined as follows, corresponding to a content in Table 2:

```
SupportedBandListEUTRAExt::= SEQUENCE (SIZE
(1..maxBands)) OF SupportedBandEUTRA
    SupportedBandEUTRA::= SEQUENCE {
    bandEUTRA       INTEGER (1..64)
    }
```

For another example:

Table 1 is directly extended to obtain Table 5, the first 64 bands in Table 5 form a band interval list corresponding to a cell supportedBandListEUTRA, the next 64 bands in Table 5 form another band interval list corresponding to a cell supportedBandListEUTRAExt; when the terminal supports a band with a sequence number 1 and bands with sequence numbers 65 and 97 in Table 5, the cell supportedBandListEUTRA includes only one cell SupportedBandEUTRA because the terminal only supports one of the first 64 bands in Table 5, wherein the cell SupportedBandEUTRA includes a band identification sub-cell bandEUTRA, and bandEUTRA is given a value of 1 to indicate that the band (uplink: 1,920 MHz-1,980 MHz, downlink: 2,110 MHz-2,170 MHz) with the sequence number 1 in Table 5 is supported; and the cell supportedBandListEUTRAExt includes two cells SupportedBandEUTRA because the terminal supports the bands with the sequence numbers 65 and 97 in an interval 65-128 in Table 5, and sub-cells bandEUTRA in the two cells SupportedBandEUTRA are given values of 1 and 33 respectively, and correspond to the band (uplink: 3,920 MHz-3,980 MHz, downlink: 3,110 MHz-3,170 MHz) with the sequence number 65 and the band (uplink: 3,900 MHz-3,920 MHz, downlink: 3,900 MHz-3,920 MHz) with the sequence number 97 in Table 5 respectively. Here, in order to save bits, the real sequence number, filled in supportedBandListEUTRAExt, of each band is the sum of the value of a cell bandEUTRA and 64, so that the values of the cell bandEUTRA are 1 and 33.

Here supportedBandListEUTRA and supportedBandListEUTRAExt are respectively defined as follows:

supportedBandListEUTRA is defined as follows, corresponding to contents at the sequence numbers 1-64 in Table 5:

```
SupportedBandListEUTRA::=   SEQUENCE (SIZE (1..maxBands))
OF SupportedBandEUTRA
    SupportedBandEUTRA::=   SEQUENCE {
    bandEUTRA               INTEGER (1..64)
    }
``` supportedBandListEUTRAExt is defined as follows, corresponding to contents at the sequence numbers 65-128 in Table 5:

supportedBandListEUTRAExt::=SEQUENCE (SIZE (1 . . . maxBands)) OF SupportedBandEUTRA the real sequence numbers of the bands in SupportedBandListEUTRAEUTRA are the sums of the values of the cells bandEUTRA and 64

```
SupportedBandEUTRA::=   SEQUENCE {
bandEUTRA               INTEGER (1..64)
}
```

For another example:

the cell corresponding to Table 1 is supportedBandListEUTRA, a cell corresponding to Table 3 is an FDD extended band list supported in EUTRA (supportedBandListEUTRAExtFDD), a cell corresponding to Table 4 is a TDD extended band list supported in EUTRA (supportedBandListEUTRAExtTDD); when the terminal supports the band with the sequence number 1 in Table 1, a band with a sequence number 1 in Table 3 and a band with a sequence number 1 in Table 4, the cell supportedBandListEUTRA includes only one cell SupportedBandEUTRA because the terminal supports only one band in Table 1, wherein the cell SupportedBandEUTRA includes a band identification sub-cell bandEUTRA, and bandEUTRA is given a value of 1 to indicate that the band (uplink: 1,920 MHz-1,980 MHz, downlink: 2,110 MHz-2,170 MHz) with the sequence number 1 in Table 1 is supported; the cell supportedBandListEUTRAExtFDD includes a cell SupportedBandEUTRA because the terminal also supports the bands with the sequence numbers 1 in Tables 3 and 4, wherein the cell SupportedBandEUTRA includes a band identification sub-cell bandEUTRA, and bandEUTRA is given a value of 1, which corresponds to the band (uplink: 3,920 MHz-3,980 MHz, downlink: 3,110 MHz-3,170 MHz) with the sequence number 1 in Table 3; and the cell supportedBandListEUTRAExtTDD includes a cell SupportedBandEUTRA, the cell SupportedBandEUTRA includes a band identification sub-cell bandEUTRA, and bandEUTRA is given a value of 1, which corresponds to the band (uplink: 3,900 MHz-3,920 MHz, downlink: 3,900 MHz-3,920 MHz) with the sequence number 1 in Table 4.

Here supportedBandListEUTRA, supportedBandListEUTRAExtFDD and supportedBandListEUTRAExtTDD are respectively defined as follows:

supportedBandListEUTRA is defined as follows, corresponding to the content in Table 1:

```
SupportedBandListEUTRA::=       SEQUENCE (SIZE
(1..maxBands)) OF SupportedBandEUTRA
    SupportedBandEUTRA::=       SEQUENCE {
    bandEUTRA                   INTEGER (1..64)
    }
``` supportedBandListEUTRAExtFDD is defined as follows, corresponding to the content in Table 3:

```
SupportedBandListEUTRAExtFDD::=    SEQUENCE (SIZE
(1..maxBands)) OF SupportedBandEUTRA
    SupportedBandEUTRA::=              SEQUENCE {
    bandEUTRA                              INTEGER (1..64)
    }
``` supportedBandListEUTRAExtTDD is defined as follows, corresponding to the content in Table 4:

```
SupportedBandListEUTRAExtTDD::=    SEQUENCE (SIZE
(1..maxBands)) OF SupportedBandEUTRA
    SupportedBandEUTRA::=              SEQUENCE {
    bandEUTRA                              INTEGER (1..64)
    }
```

The cells for representing sequence numbers of bands in the band interval lists to which the bands belong may further include first sub-cells and second sub-cells, wherein the first sub-cells represent the band interval lists to which the bands belong, and the second sub-cells represent the sequence numbers of the bands in the band interval lists to which the bands belong, for example:

the cell corresponding to Table 1 is supportedBandListEUTRA, the cell corresponding to Tables 3 and 4 is supportedBandListEUTRAExt; when the terminal supports the band with the sequence number 1 in Table 1, the band with the sequence number 1 in Table 3 and the band with the sequence number 1 in Table 4, the cell supportedBandListEUTRA includes only one cell SupportedBandEUTRA because the terminal supports only one band in Table 1, wherein the cell SupportedBandEUTRA includes a band identification sub-cell bandEUTRA, and bandEUTRA is given a value of 1 to indicate that the band (uplink: 1,920 MHz-1,980 MHz, downlink: 2,110 MHz-2,170 MHz) with the sequence number 1 in Table 1 is supported; and the cell supportedBandListEUTRAExt includes two cells SupportedBandEUTRA because the terminal supports the bands with the sequence numbers 1 in Tables 3 and 4, each cell SupportedBandEUTRA includes a band identification sub-cell bandEUTRA and sub-cell bandTableIndex for band interval list index, wherein bandTableIndex in one SupportedBandEUTRA is given a value of 3 and bandTableIndex in the other SupportedBandEUTRA is given a value of 4, which indicates that the value of bandEUTRA in the first SupportedBandEUTRA corresponds to the content in Table 3 and the value of bandEUTRA in the second SupportedBandEUTRA corresponds to the content in Table 4, and bandEUTRA in both SupportedBandEUTRA are given a value of 1 and correspond to the band (uplink: 3,920 MHz-3,980 MHz, downlink: 3,110 MHz-3,170 MHz) with the sequence number 1 in Table 3 and the band (uplink: 3,900 MHz-3,920 MHz, downlink: 3,900 MHz-3,920 MHz) with the sequence number 1 in Table 4 respectively.

Here supportedBandListEUTRA and supportedBandListEUTRAExt are respectively defined as follows:

supportedBandListEUTRA is defined as follows, corresponding to the content in Table 1:

```
SupportedBandListEUTRA::= SEQUENCE (SIZE (1..maxBands))
OF SupportedBandEUTRA
    SupportedBandEUTRA::=    SEQUENCE {
    bandEUTRA                    INTEGER (1..64)
    }
``` supportedBandListEUTRAExt is defined as follows, corresponding to contents in the other band interval lists:

```
SupportedBandListEUTRAExt::=       SEQUENCE (SIZE
(1..maxBands)) OF SupportedBandEUTRA
    SupportedBandEUTRA::=              SEQUENCE {
    bandTableIndex                         INTEGER (1..4)
    bandEUTRA                              INTEGER (1..64)
    }
``` wherein bandTableIndex is given values of 1/2/3/4, and respectively corresponds to the band interval lists 1/2/3/4.

When the band interval lists to which each band belongs are different band interval lists, the cells corresponding to each band interval list may be included in the band reporting message and presented in a list form, or may be sequentially included in the band reporting message and presented in an individual cell form; and the band reporting message is an RRC layer message, and includes an RRC Connection Request, or UE Capability Information or an RRC Connection Reestablishment Request or the like.

The method further includes that the network side receives the band reporting message from the terminal side, and determines the bands supported by the terminal side according to the cells included in the band reporting message.

Figure 2:
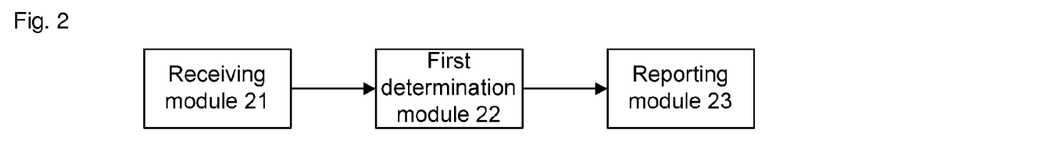
FIG. 2 is a structure diagram of a device for reporting a band extension capability according to an embodiment of the disclosure.

In order to implement the method, the embodiment of the disclosure also provides a device for reporting a band extension capability, and as shown in FIG. 2, the device includes a receiving module 21, a first determination module 22 and a reporting module 23, wherein the receiving module 21 is configured to receive terminal capability query information from a network side, and notify the first determination module 22;

the first determination module 22 is configured to determine band interval lists to which each band supported by a terminal side belongs;

the reporting module 23 is configured to report the supported bands through cells corresponding to the band interval lists to which each band belongs;

each of the band interval lists includes band information and corresponding sequence numbers; each band interval list may include at least one piece of band information, each piece of band information corresponds to a sequence number, and different band interval lists are different independent tables, or different intervals in a table; and the band interval lists may include both TDD bands and FDD bands; when a band interval list includes both TDD bands and FDD bands, band information used by the TDD bands and band information used by the FDD bands may be predefined in the band interval list; for example, a band interval list may indicate totally 64 bands, in this case it may be predefined that the FDD bands use the first 32 pieces of band information, and the TDD bands use the next 32 pieces of band information.

the band interval lists may also include the TDD bands or the FDD bands only;

the band interval lists include used band interval lists and extended band interval lists; and the extended band interval lists may be extended band interval lists including both TDD bands and FDD bands, as shown in Table 2, or may be LTE FDD extended band interval lists as shown in Table 3 as well as LTE TDD extended band interval lists as shown in Table 4, and the like.

The reporting module 23 is specifically configured to fill in the cells corresponding to the band interval lists to which each band belongs with a sequence number of each band in the band interval lists to which each band belongs, include the cells in a band reporting message, and report the cells to the network side;

the cells corresponding to the band interval lists to which each band belongs are as follows: different band interval lists correspond to different cells in the band reporting message, and the cells include cells for representing the sequence numbers of the bands in the band interval lists to which the bands belong;

the cells for representing the sequence numbers of the bands in the band interval lists to which the bands belong may further include first sub-cells and second sub-cells, wherein the first sub-cells represent the band interval lists to which the bands belong, and the second sub-cells represent the sequence numbers of the bands in the band interval lists to which the bands belong; and the band reporting message is an RRC layer message, and includes an RRC Connection Request, or UE Capability Information or an RRC Connection Reestablishment Request or the like.

During a practical application, the receiving module 21 may be implemented by virtue of a signal receiver in a terminal; the first determination module 22 may be implemented by virtue of a baseband signal processor in the terminal; and the reporting module 23 may be implemented by virtue of a signal generator in the terminal.

Figure 3:
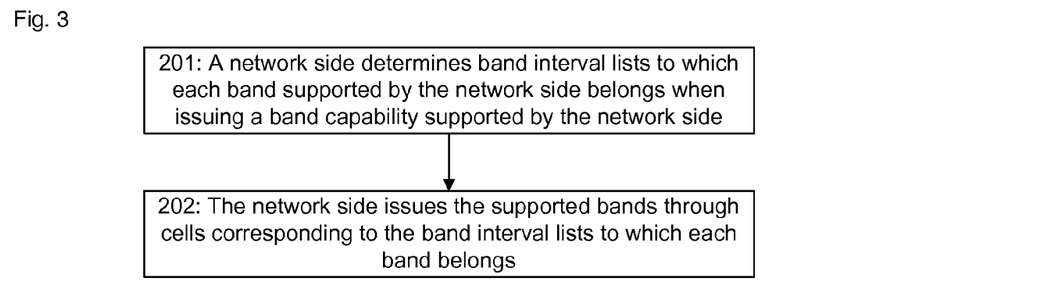
FIG. 3 is a flowchart of a method for issuing a band extension capability according to an embodiment of the disclosure.

An embodiment of the disclosure further provides a method for issuing a band extension capability, and as shown in FIG. 3, the method includes the following steps that:

Step 201: A network side determines band interval lists to which each band supported by the network side belongs when issuing a band capability supported by the network side, wherein the band interval lists include band information and corresponding sequence numbers; each band interval list may include at least one piece of band information, each piece of band information corresponds to a sequence number, and different band interval lists are different independent tables, or different intervals in a table; and the band interval lists may include both TDD bands and FDD bands; when one band interval list includes both TDD bands and FDD bands, band information used by the TDD bands and band information used by the FDD bands may be predefined in the band interval list; for example, each band interval list may indicate totally 64 bands, in this case it may be predefined that the FDD bands use the first 32 pieces of band information, and the TDD bands use the next 32 pieces of band information.

The band interval lists may also include the TDD bands or the FDD bands only;

the band interval lists include used band interval lists and extended band interval lists; and the extended band interval lists may be extended band interval lists including both TDD bands and FDD bands, as shown in Table 2, or may be LTE FDD extended band interval lists shown in Table 3 as well as LTE TDD extended band interval lists shown in Table 4, or may be extended on the basis of the 64 bands of the used band interval lists as shown in Table 5, wherein the sequence numbers 1-64 are listed in Table 1, the sequence numbers 65-128 are listed in Table 2, the frequency bands with the sequence numbers 65-96 within the frequency bands with the sequence numbers 65-128 are allocated to FDD, the remaining frequency bands with the sequence numbers 97-128 are allocated to TDD, and the like.

Step 202: The network side issues the supported bands through cells corresponding to the band interval lists to which each band belongs, specifically, the network side fills in the cells corresponding to the band interval lists to which each band belongs with a sequence number of each band in the band interval lists to which each band belongs, includes the cells in a band issuing message, and issues the cells to a terminal side; and the cells corresponding to the band interval lists to which each band belongs are as follows: different band interval lists correspond to different cells in the band issuing message, and the cells include cells for representing the sequence numbers of bands in the band interval lists to which the bands belong, for example:

a cell corresponding to Table 1 is a band indication list (FreqBandListIndicator), a cell corresponding to Table 2 is an extended band indication list supported in EUTRA (FreqBandIndListEUTRAExt); when the network side supports a band with a sequence number 1 in Table 1 and bands with sequence numbers 1 and 33 in Table 2, the cell FreqBandListIndicator includes only one band indication cell FreqBandIndicator because the network side only supports one band in Table 1, wherein the cell FreqBandIndicator is given a value of 1 to indicate that the band (uplink: 1,920 MHz-1,980 MHz, downlink: 2,110 MHz-2,170 MHz) with the sequence number 1 in Table 1 is supported; and the cell FreqBandIndListEUTRAExt includes two cells FreqBandEUTRA because the network side supports the bands with the sequence numbers 1 and 33 in Table 2, sub-cells bandEUTRA in the two cells FreqBandEUTRA are given values of 1 and 33 respectively and correspond to the band (uplink: 3,920 MHz-3,980 MHz, downlink: 3,110 MHz-3,170 MHz) with the sequence number 1 and the band (uplink: 3,900 MHz-3,920 MHz, downlink: 3,900 MHz-3,920 MHz) with the sequence number 33 in Table 2 respectively.

Here FreqBandListIndicator and FreqBandIndListEUTRAExt are respectively defined as follows:

FreqBandListIndicator is defined as follows, corresponding to the content in Table 1:

| FreqBandListIndicator::= OF FreqBandListIndicator | SEQUENCE (SIZE (1..maxBands)) |
|---|---|
| FreqBandListIndicator | INTEGER (1..64) |

FreqBandIndListEUTRAExt is defined as follows, corresponding to the content in Table 2:

| FreqBandIndListEUTRAExt::= (1..maxBands)) OF SupportedBandEUTRA | SEQUENCE (SIZE |
|---|---|
| FreqBandEUTRA::= | SEQUENCE { |
| bandEUTRA | INTEGER (1..64) |
| } | |

For another example:

Table 1 is directly extended to obtain Table 5, the first 64 bands in Table 5 form a band interval list corresponding to a cell FreqBandListIndicator, the next 64 bands in Table 5 form another band interval list corresponding to a cell FreqBandIndListEUTRAExt; when the network side supports a band with a sequence number 1 and bands with sequence numbers 65 and 97 in Table 5, the cell FreqBandListIndicator includes only one cell FreqBandIndicator because the network side only supports one of the first 64 bands in Table 5, and the cell FreqBandIndicator is given a value of 1 to indicate that the band (uplink: 1,920 MHz-1,980 MHz, downlink: 2,110 MHz-2,170 MHz) with the sequence number 1 in Table 5 is supported; and the cell FreqBandIndListEUTRAExt includes two cells FreqBandEUTRA because the network side supports the bands with the sequence numbers 65 and 97 in an interval 65-128 in Table 5, and sub-cells bandEUTRA in the two cells FreqBandEUTRA are given values of 1 and 33 respectively and correspond to the band (uplink: 3,920 MHz-3,980 MHz, downlink: 3,110 MHz-3,170 MHz) with the sequence number 65 and the band (uplink: 3,900 MHz-3,920 MHz, downlink: 3,900 MHz-3,920 MHz) with the sequence number 97 in Table 5 respectively. Here, in order to save bits, a real sequence number filled in FreqBandIndListEUTRAExt is the sum of the value of a cell bandEUTRA and 64, so that the values of the cell bandEUTRA are 1 and 33.

Here FreqBandListIndicator and FreqBandIndListEUTRAExt are respectively defined as follows:

FreqBandListIndicator is defined as follows, corresponding to contents at the sequence numbers 1-64 in Table 5:

```
FreqBandListIndicator::=      SEQUENCE (SIZE (1..maxBands))
OF FreqBandListIndicator
    FreqBandListIndicator     INTEGER (1..64)
```

FreqBandIndListEUTRAExt is defined as follows, corresponding to contents at the sequence numbers 65-128 in Table 5:

```
FreqBandIndListEUTRAExt::=       SEQUENCE (SIZE
(1..maxBands)) OF FreqBandEUTRA
    FreqBandEUTRA::=             SEQUENCE {
    bandEUTRA                        INTEGER (1..64)
    }
```

For another example:

the cell corresponding to Table 1 is FreqBandListIndicator, a cell corresponding to Table 3 is an FDD extended band indication list supported in EUTRA (FreqBandIndListEUTRAExtFDD), a cell corresponding to Table 4 is a TDD extended band indication list supported in EUTRA (FreqBandIndListEUTRAExtTDD); when the network side supports the band with the sequence number 1 in Table 1, a band with a sequence number 1 in Table 3 and a band with a sequence number 1 in Table 4, the cell FreqBandListIndicator includes only one cell FreqBandIndicator because the network side only supports one band in Table 1, and the cell FreqBandIndicator is given a value of 1 to indicate that the band (uplink: 1,920 MHz-1,980 MHz, downlink: 2,110 MHz-2,170 MHz) with the sequence number 1 in Table 1 is supported; the cell FreqBandIndListEUTRAExtFDD includes a cell FreqBandEUTRA because the network side also supports the bands with the sequence numbers 1 in Tables 3 and 4, the cell FreqBandEUTRA includes a band identification sub-cell bandEUTRA, and bandEUTRA is given a value of 1 and corresponds to the band (uplink: 3,920 MHz-3,980 MHz, downlink: 3,110 MHz-3,170 MHz) with the sequence number 1 in Table 3; and the cell FreqBandIndListEUTRAExtTDD includes a cell FreqBandEUTRA, the cell FreqBandEUTRA includes a band identification sub-cell bandEUTRA, and bandEUTRA is given a value of 1 and corresponds to the band (uplink: 3,900 MHz-3,920 MHz, downlink: 3,900 MHz-3,920 MHz) with the sequence number 1 in Table 4.

Here FreqBandListIndicator, FreqBandIndListEUTRAExtFDD and FreqBandIndListEUTRAExtTDD are respectively defined as follows:

FreqBandListIndicator is defined as follows, corresponding to the content in Table 1:

```
FreqBandListIndicator::=      SEQUENCE (SIZE (1..maxBands))
OF FreqBandListIndicator
    FreqBandListIndicator     INTEGER (1..64)
```

FreqBandIndListEUTRAExtFDD is defined as follows, corresponding to the content in Table 3:

```
FreqBandIndListEUTRAExtFDD::=       SEQUENCE (SIZE
(1..maxBands)) OF FreqBandEUTRA
    FreqBandEUTRA::=                SEQUENCE {
    bandEUTRA                           INTEGER (1..64)
    }
```

FreqBandIndListEUTRAExtTDD is defined as follows, corresponding to the content in Table 4:

```
FreqBandIndListEUTRAExtTDD::=       SEQUENCE (SIZE
(1..maxBands)) OF FreqBandEUTRA
    FreqBandEUTRA::=                SEQUENCE {
    bandEUTRA                           INTEGER (1..64)
    }
```

The cells for representing the sequence numbers of bands in the band interval lists to which the bands belong may further include first sub-cells and second sub-cells, wherein the first sub-cells represent the band interval lists to which the bands belong, and the second sub-cells represent the sequence numbers of the bands in the band interval lists to which the bands belong, for example:

the cell corresponding to Table 1 is FreqBandListIndicator, the cell corresponding to Tables 3 and 4 is FreqBandIndListEUTRAExt; when the network side supports the band with the sequence number 1 in Table 1, the band with the sequence number 1 in Table 3 and the band with the sequence number 1 in Table 4, the cell FreqBandListIndicator includes only one cell FreqBandIndicator because the network side only supports one band in Table 1, and the cell FreqBandIndicator is given a value of 1 to indicate that the band (uplink: 1,920 MHz-1,980 MHz, downlink: 2,110 MHz-2,170 MHz) with the sequence number 1 in Table 1 is supported; and the cell FreqBandIndListEUTRAExt includes two cells FreqBandEUTRA because the network side supports the bands with the sequence numbers 1 in Tables 3 and 4, each cell FreqBandEUTRA includes a band identification sub-cell bandEUTRA and a band interval list index sub-cell bandTableIndex, wherein bandTableIndex in one FreqBandEUTRA is given a value of 3 and bandTableIndex in the other FreqBandEUTRA is given a value of 4, which indicates that the value of bandEUTRA in the first FreqBandEUTRA corresponds to the content in Table 3 and the value of bandEUTRA in the second FreqBandEUTRA corresponds to the content in Table 4, and the values of bandEUTRA in both FreqBandEUTRA are 1 and correspond to the band (uplink: 3,920 MHz-3,980 MHz, downlink: 3,110 MHz-3,170 MHz) with the sequence number 1 in Table 3 and the band (uplink: 3,900 MHz-3,920 MHz, downlink: 3,900 MHz-3,920 MHz) with the sequence number 1 in Table 4 respectively.

Here FreqBandListIndicator and FreqBandIndListEUTRAExt are respectively defined as follows:

FreqBandListIndicator is defined as follows, corresponding to the content in Table 1:

| | |
|---|---|
| FreqBandListIndicator::= OF FreqBandListIndicator | SEQUENCE (SIZE (1..maxBands)) |
| FreqBandListIndicator | INTEGER (1..64) |

FreqBandIndListEUTRAExt is defined as follows, corresponding to contents in the other band interval lists:

| | |
|---|---|
| FreqBandIndListEUTRAExt::= (1..maxBands)) OF FreqBandEUTRA | SEQUENCE (SIZE |
| FreqBandEUTRA::= | SEQUENCE { |
| bandTableIndex | INTEGER (1..4) |
| bandEUTRA | INTEGER (1..64) |
| } | | wherein bandTableIndex is given values of 1/2/3/4, and corresponds to the band interval lists 1/2/3/4 respectively.

When the band interval lists to which each band belongs are different band interval lists, the cells corresponding to each band interval list may be included in a band issuing message and presented in a list form, or may be sequentially included in a band issuing message and presented in an individual cell form; and the band issuing message is an RRC layer message, and includes System Information, System Information Block Type 1, or RRC Connection Reconfiguration, or RRC Connection Setup or RRC Connection Reestablishment, or the like;

here, the network side issues band capability information by taking a cell as granularity, and all bands included in each cell are identified.

The method further includes that: the terminal side receives the band issuing message from the network side, and determines the bands supported by the network side according to the cells included in the band issuing message.

Figure 4:
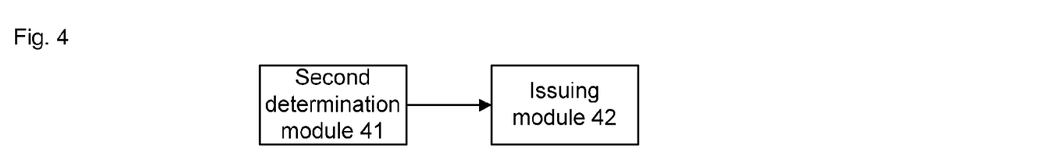
FIG. 4 is a structure diagram of a device for issuing a band extension capability according to an embodiment of the disclosure.

In order to implement the method, an embodiment of the disclosure also provides a device for issuing a band extension capability, and as shown in FIG. 4, the device includes a second determination module 41 and a issuing module 42, wherein the second determination module 41 is configured to determine band interval lists to which each band supported by a network side belongs when issuing a band capability supported by the network side;

the issuing module 42 is configured to issue the supported bands through cells corresponding to the band interval lists to which each band belongs;

each of the band interval lists includes band information and corresponding sequence numbers; each band interval list may include at least one piece of band information, and each piece of band information corresponds to a sequence numbers; and each of the band interval list may include both TDD bands and FDD bands; when each band interval list includes both TDD bands and FDD bands, band information used by the TDD bands and band information used by the FDD bands may be predefined in the band interval lists; for example, each band interval list may indicate totally 64 bands, in this case it may be predefined that the FDD bands use the first 32 pieces of band information, and the TDD bands use the next 32 pieces of band information.

Each of the band interval lists may also include the TDD bands or the FDD bands only;

the band interval lists include used band interval lists and extended band interval lists; and the extended band interval lists may be extended band interval lists including both TDD bands and FDD bands, as shown in Table 2; or the extended band interval lists may also be LTE FDD extended band interval lists shown in Table 3 as well as LTE TDD extended band interval lists shown in Table 4, and the like.

The issuing module 42 is specifically configured to fill in the cells corresponding to the band interval lists to which each band belongs with a sequence number of each band in the band interval lists to which each band belongs, include the cells in a band issuing message, and issue the cells to the terminal side;

the cells corresponding to the band interval lists to which each band belongs are as follows: different band interval lists correspond to different cells in the band issuing message, and the cells include cells for representing the sequence numbers of the bands in the band interval lists to which the bands belong;

the cells for representing the sequence numbers of the bands in the band interval lists to which the bands belong may further include first sub-cells and second sub-cells, wherein the first sub-cells represent the band interval lists to which the bands belong, and the second sub-cells represent the sequence numbers of the bands in the band interval lists to which the bands belong; and the band issuing message is an RRC layer message, and includes System Information, System Information Block Type 1, RRC Connection Reconfiguration, RRC Connection Setup, RRC Connection Reestablishment and the like.

During a practical application, the second determination module 41 may be implemented by virtue of a baseband signal processor of the network side; and the issuing module 42 may be implemented by virtue of a signal generator of the network side.

INDUSTRIAL APPLICABILITY

From the above, by the embodiments of the disclosure, the bands belonging to different band interval lists can be reported and issued through different cells, and the problem of limitations to the number of the bands during the reporting and issuing of the bands can be effectively solved.

The above are only the preferred embodiments of the disclosure and not intended to limit the scope of protection of the disclosure.

What is claimed is:

1. A method for reporting a band extension capability, comprising:
   receiving, by a terminal side, terminal capability query information from a network side, determining band interval lists to which each band supported by the terminal side belongs, and reporting supported bands through cells corresponding to the band interval lists to which each band belongs,
   wherein the band interval lists comprise band information and corresponding sequence numbers; each of the band interval lists comprises at least one piece of band information, and each piece of band information corresponds to a sequence number; and different band interval lists are different independent tables, or different intervals in a table.

2. The method according to claim 1, wherein the band interval lists comprise both Time Division Duplex (TDD) bands and Frequency Division Duplex (FDD) bands; and band information used by the TDD bands and band information used by the FDD bands are predefined in the band interval lists.

3. The method according to claim 1, wherein the band interval lists comprise TDD bands or FDD bands.

4. The method according to claim 2, wherein reporting the supported bands through the cells corresponding to the band interval lists to which each band belongs comprises: filling in, by the terminal side, the cells corresponding to the band interval lists to which each band belongs with a sequence number of each band in the band interval lists to which each band belongs, including the cells in a band reporting message, and reporting the cells to the network side.

5. The method according to claim 4, wherein the cells corresponding to the band interval lists to which each band belongs are as follows: different band interval lists correspond to different cells in the band reporting message, and the cells comprise cells for representing sequence numbers of bands in band interval lists to which the bands belong.

6. The method according to claim 5, wherein the cells for representing the sequence numbers of the bands in the band interval lists to which the bands belong comprise first sub-cells and second sub-cells, wherein the first sub-cells represent the band interval lists to which the bands belong, and the second sub-cells represent the sequence numbers of the bands in the band interval lists to which the bands belong.

7. The method according to claim 5, further comprising: when the band interval lists to which each band belongs are different band interval lists, including the cells corresponding to the band interval lists in the band reporting message and presenting the cells in a list form, or sequentially including the cells in the band reporting message and presenting the cells in an individual cell form.

8. The method according to claim 7, wherein the band reporting message is a Radio Resource Control (RRC) layer message, and comprises an RRC Connection Request, or User Equipment (UE) Capability Information or an RRC Connection Reestablishment Request.

9. A device for reporting a band extension capability, comprising a receiving module, a first determination module and a reporting module, wherein
the receiving module is configured to receive terminal capability query information from a network side, and notify the first determination module;
the first determination module is configured to determine band interval lists to which each band supported by a terminal side belongs; and
the reporting module is configured to report supported bands through cells corresponding to the band interval lists to which each band belongs,
wherein the band interval lists comprise band information and corresponding sequence numbers; each of the band interval lists comprises at least one piece of band information, and each piece of band information corresponds to a sequence number; and different band interval lists are different independent tables, or different intervals in a table.

10. The device according to claim 9, wherein the reporting module is configured to fill in the cells corresponding to the band interval lists to which each band belongs with a sequence number of each band in the band interval lists to which each band belongs, include the cells in a band reporting message, and report the cells to the network side.

11. A method for issuing a band extension capability, comprising:
determining, by a network side, band interval lists to which each band supported by the network side belongs when issuing a band capability supported by the network side, and issuing supported bands through cells corresponding to the band interval lists to which each band belongs,
wherein the band interval lists comprise band information and corresponding sequence numbers; each of the band interval lists comprises at least one piece of band information, and each piece of band information corresponds to a sequence number; and different band interval lists are different independent tables, or different intervals in a table.

12. The method according to claim 11, wherein the band interval lists comprise both Time Division Duplex (TDD) bands and Frequency Division Duplex (FDD) bands; and band information used by the TDD bands and band information used by the FDD bands are predefined in the band interval lists.

13. The method according to claim 11, wherein the band interval lists comprise TDD bands or FDD bands.

14. The method according to claim 11, wherein issuing the supported bands through the cells corresponding to the band interval lists to which each band belongs comprises: filling in, by the network side, the cells corresponding to the band interval lists to which each band belongs with a sequence number of each band in the band interval lists to which each band belongs, including the cells in a band issuing message, and issuing the cells to a terminal side.

15. The method according to claim 14, wherein the cells corresponding to the band interval lists to which each band belongs are as follows: different band interval lists correspond to different cells in the band issuing message, and the cells comprise cells for representing sequence numbers of bands in band interval lists to which the bands belong.

16. The method according to claim 15, wherein the cells for representing the sequence numbers of the bands in the band interval lists to which the bands belong comprise first sub-cells and second sub-cells, wherein the first sub-cells represent the band interval lists to which the bands belong, and the second sub-cells represent the sequence numbers of the bands in the band interval lists to which the bands belong.

17. The method according to claim 14, further comprising: when the band interval lists to which each band belongs are different band interval lists, including the cells corresponding to the band interval lists in the band issuing message and presenting the cells in a list form, or sequentially including the cells in the band issuing message and presenting the cells in an individual cell form.

18. The method according to claim 17, wherein the band issuing message is a Radio Resource Control (RRC) layer message, and comprises System Information, System Information Block Type 1, or RRC Connection Reconfiguration, or RRC Connection Setup or RRC Connection Reestablishment.

19. A device for issuing a band extension capability, comprising a second determination module and an issuing module, wherein
the second determination module is configured to determine band interval lists to which each band supported by a network side belongs when issuing a band capability supported by the network side; and the issuing module is configured to issue supported bands through cells corresponding to the band interval lists to which each band belongs, wherein the band interval lists comprise band information and corresponding sequence numbers; each of the band interval lists comprises at least one piece of band information, and each piece of band information corresponds to a sequence number; and different band interval lists are different independent tables, or different intervals in a table.

20. The device according to claim 19, wherein the issuing module is configured to fill in the cells corresponding to the band interval lists to which each band belongs with a sequence number of each band in the band interval lists to which each band belongs, include the cells in a band issuing message, and issue the cells to a terminal side.

* * * * *